United States Patent [19]

Mainquist et al.

[11] Patent Number: 4,756,213
[45] Date of Patent: Jul. 12, 1988

[54] TRANSMISSION CONTROL WITH A CLUTCH PRIORITY VALVE

[75] Inventors: James K. Mainquist, Mt. Clemens; Robert B. Deady, Plymouth; Robert C. Downs, Ortonville, all of Mich.

[73] Assignee: Saturn Corporation, Troy, Mich.

[21] Appl. No.: 56,231

[22] Filed: Jun. 1, 1987

[51] Int. Cl.⁴ ............... B60K 41/18; B60K 41/16; B60K 20/10

[52] U.S. Cl. ............................. 74/866; 74/867; 74/335

[58] Field of Search ............... 74/335, 868, 867, 866

[56] References Cited

U.S. PATENT DOCUMENTS

| | | | |
|---|---|---|---|
| 3,808,903 | 5/1974 | Sauer | 74/335 |
| 4,094,211 | 6/1978 | Espenschied | 74/866 X |
| 4,175,448 | 11/1979 | Loew et al. | 74/335 X |
| 4,252,148 | 2/1981 | Fochtman et al. | 74/868 X |
| 4,442,727 | 4/1984 | Young | 74/868 X |
| 4,478,108 | 10/1984 | Nishimura et al. | 74/866 |
| 4,517,859 | 5/1985 | Nagaoka et al. | 74/866 |
| 4,633,737 | 1/1987 | Nishikawa et al. | 74/866 |
| 4,649,775 | 3/1987 | Ootani | 74/335 X |
| 4,653,352 | 3/1987 | Nakao et al. | 74/335 X |
| 4,660,441 | 4/1987 | Young | 74/866 |
| 4,671,139 | 6/1987 | Downs et al. | 74/866 |
| 4,707,789 | 11/1987 | Downs et al. | 74/866 X |

Primary Examiner—Dirk Wright
Attorney, Agent, or Firm—Donald F. Scherer

[57] ABSTRACT

A hydraulic transmission control uses a plurality of solenoid valves to control the engagement of friction devices during the shifting of a transmission between gear ratios. A clutch priority valve is provided to prevent the continuous simultaneous engagement of friction devices which will establish more than one ratio. Also provided is a manually controlled valve which permits the operator to determine the range in which the transmission will operate.

If the clutch priority valve has been actuated, the transmission ratio can be controlled between a low ratio, for example, second gear, and a high ratio, for example, third or fourth gear, by use of the manual valve in combination with an actuator mode valve. The clutch priority valve, when actuated, is also operable to disengage a torque converter clutch.

2 Claims, 2 Drawing Sheets

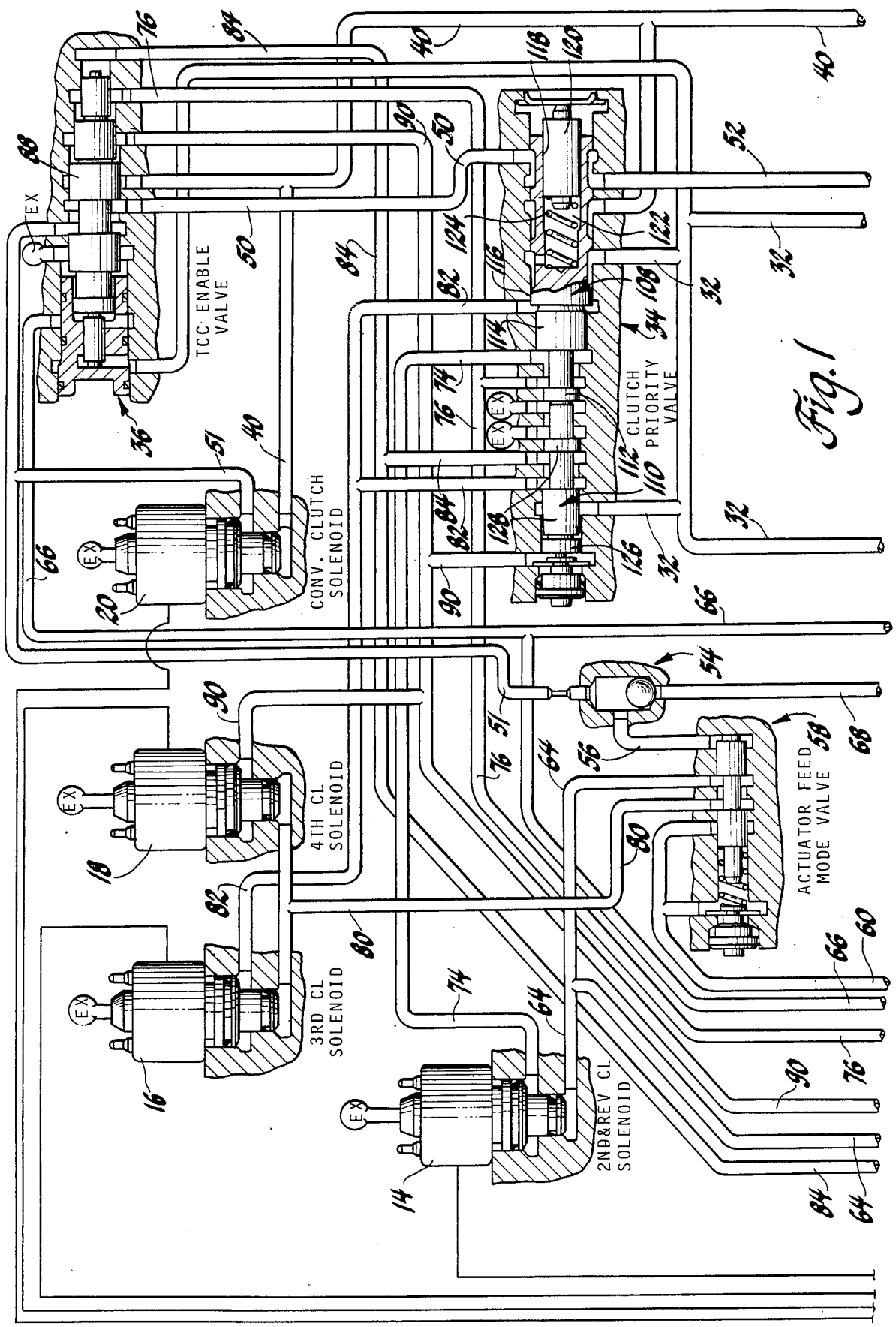

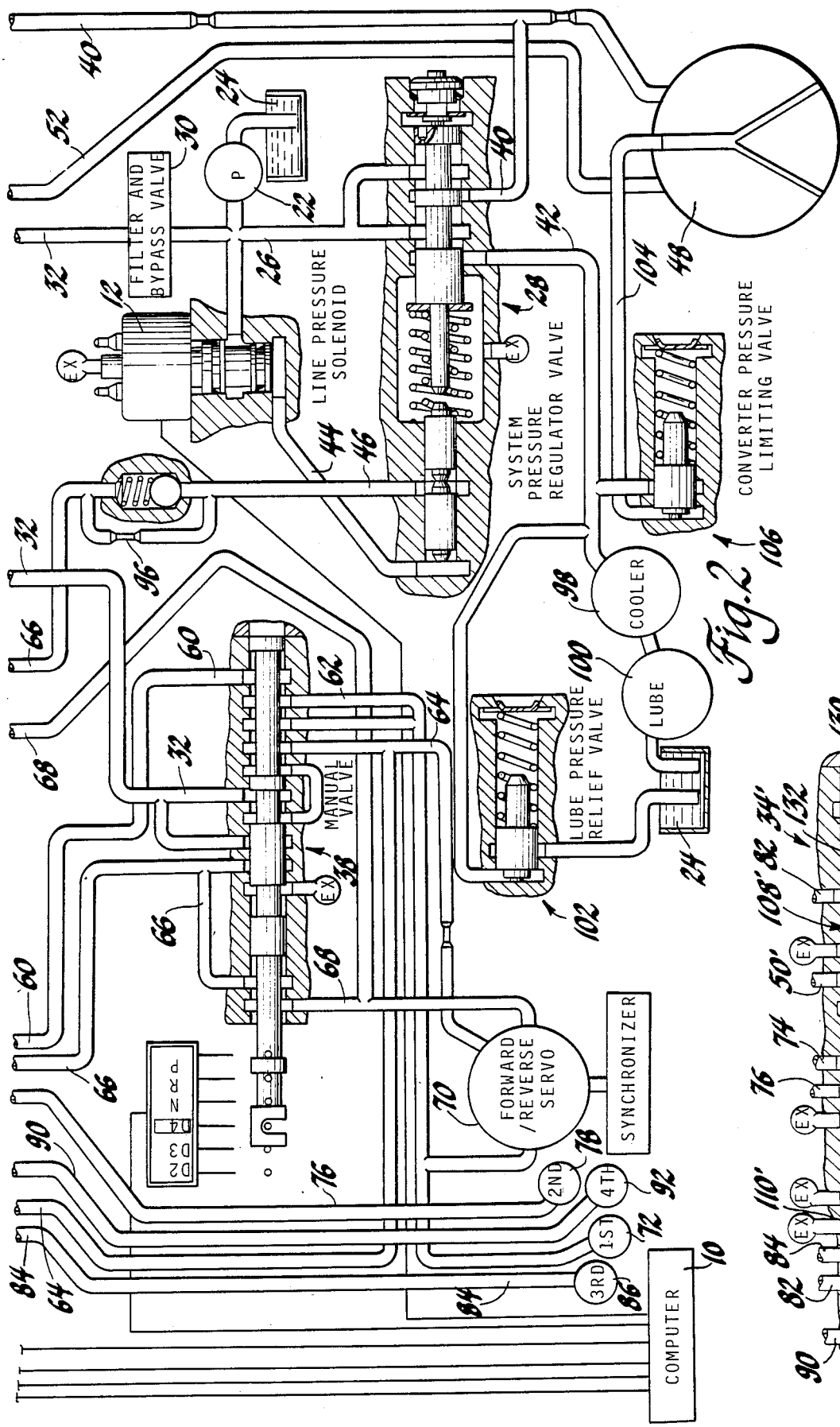

TRANSMISSION CONTROL WITH A CLUTCH PRIORITY VALVE

BACKGROUND OF THE INVENTION

This invention relates to transmission controls and more particularly to transmission controls for automatically shifted transmissions.

In automatically shifted transmissions, it is well-known to provide selectively operable friction devices which will establish various drive ratios between the transmission input and the transmission output. It is not desirable to have these friction devices continuously and simultaneously engaged, if during engagement, an attempt to establish more than one drive ratio occurs.

In many planetary type transmissions, this is prevented by utilizing a band brake to establish one transmission ratio and a disc clutch to establish the other. In these arrangements, it is common to utilize the on-going clutch pressure to disengage the band brake. In other hydraulic schemes, it is common to utilize a shift valve which will direct fluid to one or the other of two friction devices, but not both simultaneously, thereby preventing the simultaneous establishment of these devices.

With the advent of electronically controlled transmissions, wherein each friction device is controlled by a separate solenoid valve, it becomes exceedingly difficult to ensure that the simultaneous establishment of more than one drive ratio will not occur.

SUMMARY OF THE INVENTION

The present invention seeks to provide a simple and compact valve mechanism which will assure that simultaneous engagement of more than one friction device will not occur. This is accomplished through the use of a clutch priority valve which is biased in one direction by the line pressure of the control system and urged in the other direction by the apply pressure of the ratio determining friction devices.

If more than one friction device is at or above a predetermined pressure level, the force on the clutch priority valve will be such that the valve will shift thereby exhausting the lower ranking clutch and maintaining engagement of the higher ranking clutch. In the preferred embodiment of this invention, the higher ranking clutch will establish the gear ratio resulting in the highest speed ratio.

It should be recognized, however, that it may be necessary or desirable for the operator to establish a lower gear ratio if higher torque output is desired. This can be achieved through selective use of a manual control valve and an actuator mode valve. Since most automatic transmissions utilize a torque converter or fluid coupling of some type, and a torque converter clutch, it is desirable to disengage the torque converter clutch when the possible establishment of simultaneous drive ratios occur.

The present invention achieves the disengagement of the torque converter clutch by utilizing the clutch priority valve to connect the clutch engagement passage with the clutch disengagement passage, thereby disengaging the torque converter clutch.

It is therefore an object of this invention to provide an improved transmission control wherein a priority valve is operable to prevent the continued simultaneous engagement of friction devices which attempt to establish separate and distinct gear ratios within the transmission.

It is another object of this invention to provide an improved transmission control for a power transmission having a plurality of friction devices which are selectively engageable to establish separate and distinct gear ratios in the transmission, wherein the control includes an automatically actuated priority valve for preventing the continued engagement of two or more friction devices and an actuator feed valve which cooperates with a manual valve to permit the operator to select a lower ratio after actuation of the priority valve.

It is a further object of this invention to provide an improved transmission control for a power transmission having a torque converter, a torque converter clutch, a plurality of selectively engageable friction devices which are operable to establish a plurality of gear ratios in the transmission, wherein the control includes a priority valve which is operable in the event that two or more friction devices compete for simultaneous engagement to establish two or more gear ratios, to enforce establishment of the higher of the competing gear ratios and simultaneously to disengage the torque converter clutch.

DESCRIPTION OF THE DRAWINGS

FIGS. 1 and 2 are diagrammatic representations which, when combined, depict a transmission control circuit incorporating the present invention.

FIG. 3 is a modified valve which can be utilized in the control system represented by FIGS. 1 and 2.

DESCRIPTION OF THE PREFERRED EMBODIMENT

The hydraulic control system shown in FIGS. 1 and 2, is preferably utilized with a countershaft type automatic transmission, not shown. As is well-known, these types of transmissions have coaxially aligned input and output shafts and a countershaft. A plurality of meshing gear sets are disposed between these shafts and at least one of each gear set is controlled by a selectively engageable friction clutch. Engagement of the individual clutches determines the operating gear ratio through the transmission. The general design of the transmission is similar to a synchronizer type transmission with the exception that hydraulically operated friction clutches are utilized in the place of synchronizers.

With these types of transmissions, it is known to use a torque converter which includes a torque converter clutch. In the controls for such transmissions, it has been proposed that electronic features be utilized. U.S. patent application Ser. No. 802,676, now U.S. Pat. No. 4,707,789, filed Nov. 29, 1985, in the name of Downs et al. and Ser. No. 822,397, now U.S. Pat. No. 4,671,139, filed Jan. 27, 1986, in the name of Downs et al. and both assigned to the assignee of the present invention, describe transmissions and electronic controls in which the present invention might be incorporated.

The electronic controls are shown as a computer 10 in FIG. 2 of the present invention. This computer is connected to electrically control a line pressure solenoid 12, a second and reverse clutch solenoid 14, a third clutch solenoid 16, a fourth clutch solenoid 18 and a converter clutch solenoid 20. These solenoids 12 through 20 may be constructed in accordance with any of the well-known control solenoids and are preferably of the pulse-width-modulated type with the exception of the converter clutch solenoid 20 which may be a simple off/on type solenoid. If it is not desirable to have accurate pressure control of the on-coming and off-going clutches, the other clutch control solenoids can also be of the off/on type.

The hydraulic control includes a pump 22 which may be constructed in accordance with any of the well-known hydraulic pumps which are commercially available and used with automatic transmissions. The pump draws fluid from a reservoir 24 and delivers fluid to an unfiltered main pressure passage 26. The passage 26 connects with a system pressure regulator valve 28 and the line pressure solenoid 12.

The passage 26 is also connected through a filter and bypass valve 30 to a filtered main pressure passage 32 which is in fluid communication with a clutch priority valve 34, a torque converter clutch (TCC) enable valve 36 and a manual valve 38.

The regulator valve 28 is operable in a well-known manner to establish the maximum system pressure which will be utilized by the various control elements. The regulator valve 28 receives fluid from the main passage 26 and at a predetermined pressure level, opens to admit fluid to a TCC feed passage 40, and in succession to a lube and cooler passage 42. The pressure level at which the main regulator valve operates is a variable and controlled by fluid pressure in a line control passage 44 or a line boost passage 46. Pressure in the line control passage 44 is established by the line pressure solenoid 12 at a level determined by the computer 10.

As is well-known, input signals, such as engine torque, engine speed, vehicle speed and transmission temperature, etc., are given to the computer for the determination of the proper main pressure level. The fluid pressure in the TCC feed passage is operable to deliver fluid to a torque converter 48 and also engage the torque converter clutch, not shown.

The converter solenoid valve is connected to the TCC feed passage 40 and is operable to direct fluid to a TCC release passage 51. Fluid pressure in another TCC release passage 50 is directed through the TCC enable valve 36 and the clutch priority valve 34 to a TCC off or disengage passage 52 which in turn is connected to the torque converter 48 to disengage the torque converter clutch. The TCC release passage 51 is also in fluid communication through a shuttle valve 54 to a passage 56 which is connected with an actuator feed mode valve 58.

Manual valve 38 is manipulable by the operator to a plurality of forward drive positions, D2, D3, D4, neutral N, a reverse position R and a park position P. The manual valve 38 is operable to distribute filtered main pressure in passage 32 to a 3-4 enable passage 60, a first clutch passage 62, a 2-R actuator passage 64, a 2-R line boost passage 66 and a reverse passage 68.

In each of the forward drive positions, the first clutch passage 62 is pressurized and is operable to ensure that a forward/reverse servo 70 is in the forward position and the first clutch 72 is engaged. The first clutch 72 is connected with its respective gear member through a one-way device, such that on gear ratios above first gear, the first clutch does not have to be disengaged. Such arrangements are well-known in countershaft type transmissions. Also, in all forward drive positions, the 2-R actuator passage 64 is pressurized. This passage 64 distributes pressure to the actuator feed mode valve 58 and to the second and reverse clutch solenoid 14.

When it is desirable to shift from first to second gear, as determined by the computer 10, the solenoid 14 is operable to distribute fluid pressure from passage 64 to a second and reverse feed passage 74 which is connected through the clutch priority valve 34 to a second and reverse clutch passage 76, which in turn, is connected to a second and reverse clutch 78.

With the forward/reverse servo 70 in the forward position and the clutch 78 engaged, the transmission will be conditioned for second gear operation. In D3 and D4, the 3-4 enable passage 60 is pressurized. This passage 60 is connected through the actuator feed mode valve 58 and will ensure that the feed mode valve 58 is in the spring set position shown, whereby fluid pressure from the 2-R actuator line 64 is connected to a 3-4 actuator line passage 80. The 3-4 actuator line 80 is connected to both the third clutch solenoid 16 and the fourth clutch solenoid 18.

The third clutch solenoid is operable when energized by the computer 10 to distribute fluid from passage 80 to a third clutch feed passage 82, which is operable, through the clutch priority valve 34 to distribute fluid pressure to a third clutch passage 84. The third clutch passage 84 is connected to a third clutch 86 which, when engaged, is operable to establish third gear in the transmission.

Under normal operation, when the third clutch solenoid is being actuated to increase the pressure in the third feed passage 82, the second reverse clutch solenoid 14 will be operable to reduce the pressure in passage 74. The second and reverse passage 76 and the third clutch passage 84 are both connected through the torque converter clutch enable valve 36. Fluid pressure in either of these lines will be operable to move the TCC enable valve spool 88 against a line pressure bias to the position shown. When the TCC enable valve 36 is moved to the position shown and the clutch solenoid 20 is deenergized, the torque converter clutch will be engaged.

Prior to the operation in second gear, a line pressure bias on the left end of valve spool 88 ensures a fluid connection between the converter feed passage 40 and the torque converter release passage 50 to ensure that the torque converter clutch is disengaged during first gear operation regardless of the condition of the converter clutch solenoid 20.

The fourth clutch solenoid 18 is actuated by the computer 10 to connect passage 80 to a fourth clutch passage 90. The fourth clutch passage 90 is connected to a fourth clutch 92 to engage the clutch 92 and place the transmission in fourth gear.

During normal operation, when the computer 10 energizes solenoid 18 to increase the pressure in passage 90, the solenoid 16 is simultaneously controlled to reduce the pressure in passage 82. The fourth clutch passage 90 is connected to the left end of the clutch priority valve 34 and to a differential area on the valve spool 88 on the TCC enable valve 36. This ensures that the torque converter clutch will remain engaged during fourth gear operation unless the solenoid 20 is actuated.

When the manual valve 38 is shifted to reverse R, reverse passage 68 and 2-R line boost passage 66 are pressurized. Fluid pressure in reverse passage 68 is operable to move the forward/reverse servo to the reverse position so that the transmission can be conditioned for reverse operation.

Movement of the forward/reverse servo 70 results in fluid communication between passages 68 and 64. Passage 64 is operable through the second and reverse clutch solenoid 14 to cause engagement of the second and reverse clutch 78. The use of the forward/reverse servo 70 to provide engagement pressure control for the clutch 78, ensures that the synchronizer will be moved to the reverse position prior to the establishment of a torque carrying clutch. This reduces the likelihood of synchronizer clash in the transmission.

The reverse passage 68 is also connected with the shuttle valve 54. When the reverse passage 68 is pressurized, the actuator mode valve 58 will be pressurized through passage 56 at the right end thereof, thereby causing the actuator feed valve 58 to close the 3-4 actuator passage 80 such that third or fourth gear cannot be established. The actuator valve 58 also assumes the closed position whenever the torque converter clutch solenoid is energized unless passage 60 is pressurized.

The 2-R line boost passage 66 is connected to the TCC enable valve to cause rightward movement of the valve spool 88 thereby ensuring a fluid connection between the TCC feed passage 40 and the TCC release passage 50. This prevents engagement of the torque converter clutch when either reverse or D2 is selected. The 2-R line boost passage 66 is connected through a restriction 96 and a conventional check valve to the line boost passage 46. Fluid pressure in the line boost passage 46 is operable to increase the main line pressure in passages 36 and 22. When the line boost passage 46 is pressurized, line pressure is substantially at constant. The check valve permits rapid exhausting of the passage 46 when line boost is no longer desired. This is particularly useful in the event that solenoid 12 should not be functioning properly resulting in a low line pressure. The vehicle will operate satisfactorily, under this condition, if manual second D2 or reverse is selected by the driver.

The excess fluid from the pump 22 is distributed to the cooler and lube passage 42 which is connected through a cooler 98 and the transmission lube circuit 100 from which it is returned to the reservoir 24. A relieve valve 102 is provided to ensure that the fluid pressure in the cooler 98 and the lube circuit 100 does not exceed a predetermined amount.

The fluid entering the torque converter 48 is returned therefrom by a passage 104 to a converter pressure limiting valve 106. The valve 106 ensures that a minimum pressure is maintained within the torque converter 48. After leaving the valve 106, the fluid is distributed through the cooler 98 and lube circuit 100.

The clutch priority valve 34 includes a primary valve spool 108 and a secondary valve spool 110 which are coaxially aligned in a stepped diameter valve bore. The primary valve 108 has a small land 112, an intermediate land 114 and a plurality of large diameter lands 116. The primary valve spool 108 has an internal cylindrical cavity 118 in which is slidably disposed and sealingly engaged therewith, a plug 120. The plug 120 and cavity 118 cooperate to provide a closed chamber 122 in which is disposed a coil spring 124 operable to urge both valve spools 108 and 110 leftward and plug 120 rightward against a stop.

The chamber 122 is in fluid communication with main line pressure from passage 32. Therefore, the valve spool 108 has imposed thereon a leftward pressure bias due to the action of line pressure in passage 32 acting in a leftward direction on the ends of cavity 122.

The differential area between lands 116 and 114 is in fluid communication with the third feed passage 82. Thus, whenever the third feed passage is pressurized, the pressure acting on the differential area will impose a rightward bias on the valve spool 108. The rightward bias on this differential area is less than the leftward bias imposed by the spring 124 and line pressure in chamber 122.

The differential area between small land 112 and land 114 is connected with the second and reverse feed passage 74. The fluid pressure acting on this differential area creates a rightward bias on the valve spool 108. This rightward bias is less than the leftward bias imposed by spring 124 and fluid pressure in cavity 122. However, if for some reason, both solenoids 14 and 16 are energized and the fluid pressure in passage 74 and 82 each rise above a respective predetermined level, the rightward bias cause by these pressures acting on their respective differential areas will be greater than the leftward bias imposed by the spring 124 and fluid pressure in cavity 122.

The net result will be to cause the primary valve 108 to move rightward. As the valve 108 moves rightward, the second and reverse clutch passage 76 will be connected to exhaust through the clutch priority valve 34 and the TCC off passage 52 will be connected to the TCC feed passage through the clutch priority valve 34. With this action, the second and reverse clutch 78 will disengage and the torque converter clutch will disengage. However, since the third feed passage 82 is pressurized, the third clutch 86 will be engaged. Therefore, with both solenoids 14 and 16 energized, third gear operation will be maintained.

The valve spool 110 has a large diameter land 126 and a pair of small diameter lands 128. The differential area between lands 126 and one of the lands 128 is subjected to system main line pressure in passage 32, thus creating a leftward bias on the valve spool 110. The leftward bias created by this differential area acts in concert with the leftward bias on valve 108 to maintain the valve spool 110 in the leftward position during normal operation.

As previously mentioned, the fourth clutch passage 90 is in fluid communication with the clutch priority valve to the left face of the valve land 126. When the fourth clutch is energized, fluid pressure acting on the left end of valve land 126 creates a rightward bias on the valve spools 110 and 108. This rightward bias is not sufficient to overcome the leftward bias created by the spring 124 and by the pressure acting in chamber 122 and on the differential area of valve spool 110.

If solenoids 16 and 18 are simultaneously operated, rightward bias in the fourth clutch passage 90 and from the third feed passage 82 will be effective on the valve spools 110 and 108. These two biases will be sufficient to cause rightward movement of both valve spools 110 and 108. With this rightward movement, the third clutch passage 84 will be connected to exhaust through the clutch priority valve 34 such that only the fourth clutch will remain engaged. If the solenoids 14 and 18 are simultaneously engaged, the valve spools 110 and 108 will receive rightward bias pressures from passage 90 and 74, respectively.

These rightward biases will be sufficient to overcome the leftward bias such that the second and reverse clutch passage 76 will be exhausted through the priority valve 34 and therefore clutch 78 will be disengaged. Again, only clutch 92 will remain engaged and the transmission will be maintained in fourth gear.

As mentioned previously, the movement of the priority valve 34 will also cause disengagement of the torque converter clutch. If the solenoids 14, 16 or 18 should malfunction, it is apparent from the above description that the transmission will seek the highest available gear ratio.

There will be instances when the operator desires second gear operation. Second gear operation can be attained by manipulating the manual valve 38 to the D2 position. With the manual valve 38 in the D2 position, the 3-4 engage passage 60 is disengaged. Depending on the signals at the computer 10, the TCC release passage 51 is pressurized. Fluid pressure through shuttle valve 54 enters passage 56 to cause the actuator mode valve to exhaust the 3-4 actuator passage, which in turn, will prevent pressurization of either the third or fourth clutch passage 82 and 90, respectively. Under these conditions, the only clutches that can be engaged are first clutch 72 and second clutch 78. Thus, some manual control over transmission ratio is still available. The computer 10 will not permit second gear operation if, for example, the vehicle speed is above a predetermined value.

A modified form of the clutch priority valve is shown as 34' in FIG. 3. This valve also has two spool valves 108' and 110'. Spool valve 110' has imposed thereon a line pressure bias and a fourth clutch pressure bias. Valve spool 108' has imposed thereon two line pressure biases and a spring bias in the leftward direction and a second reverse feed bias and third feed bias in the rightward direction.

Pressurization of these biases operates in a manner identical to that described above for valve 34. A further feature is found in the valve 34'. This feature is comprised of a ball check valve 130 which admits line pressure to the end of a bias spool 132. The ball check valve permits rapid increase of line pressure. A restriction 134 limits the egress of fluid from the chamber at the right end of the bias spool 132.

When the clutch priority valve 34' attempts to move rightwardly due to the simultaneous pressurization of two or more of the rightward bias areas, the fluid pressure on the right face of the bias spool 132 will begin to increase rapidly due to the restriction 134. this will increase the time necessary for the clutch priority valve 34' to exhaust the lower ranking clutches. Such a system is useful when a "firm" shift pattern is desired. That is, it is desirable to ensure that the on-coming clutch has sufficient torque capacity before releasing the off-going clutch.

When this type of a control system is utilized, it is possible to instantaneously permit high pressures in two or more of the bias areas. By increasing the time delay at which the priority valve 34' operates, these instantaneous clutch overlaps are ignored by the control. However, should two or more of the rightward bias pressures remain for an extended period of time, the priority valve 34' will exhaust the lower ranking clutches.

The valve 34' has one other feature different from valve 34. A passage 50' communicates with a differential area (not shown), formed on the TCC enable valve 36 to provide a rightward bias to connect the passage 40 to passage 50.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in transmission controls for a transmission having a plurality of speed ratios established by engaging and disengaging a plurality of fluid operated friction devices, said control including a source of fluid pressure, a plurality of solenoid valve means operable to direct pressurized fluid for controlling respective ones of said friction devices to establish respective speed ratios and a manual valve manipulable by a vehicle operator to select a desired drive range from a plurality of drive ranges with one of said drive ranges being operable to connect the source of fluid pressure with said solenoid valve means to permit automatic shifting between the speed ratios by selective energization of the solenoid valve means, wherein the improvement comprises: clutch priority control valve means for directing fluid flow to a low speed ratio friction device and a high speed ratio friction device, and being in fluid communication with said source of fluid pressure and another higher speed ratio friction device comprising; primary valve means for directing fluid flow to the low speed ratio friction device including a first fluid pressure responsive area means subjected to pressure from said source for urging said primary valve means in one direction, a second fluid pressure responsive area means subject to the fluid pressure in the low speed ratio friction device for urging said primary valve in the other direction, a third fluid pressure responsive area means subject to the fluid pressure in the higher speed ratio friction device for urging said primary valve means in the other direction, said first pressure responsive area means being greater than either of the second or third pressure responsive area means and less than the sum of the second and third pressure responsive area means and spring means for urging said primary valve in the one direction; and secondary valve means for controlling fluid flow to the friction device controlling the high speed ratio including a first pressure responsive area means subjected to the source of pressure for urging the secondary valve means in the one direction, and second pressure responsive area means subject to the pressure in said friction device controlling the other high speed ratio for urging the secondary valve means in the other direction, the sum of said first area means of said secondary valve means and the first area means of said primary valve means being greater than the second pressure responsive area means of said secondary valve means and the sum of said second pressure responsive area means of said secondary valve means and either the second or third pressure responsive area means of said primary valve means being greater than the sum of the first pressure responsive area means of both the primary valve means and the secondary valve means whereby the simultaneous engagement of any two of the friction devices is prevented.

2. An improvement in transmission controls for a transmission having a torque converter and a selectively engageable torque converter clutch, and a plurality of speed ratios established by engaging and disengaging a plurality of fluid operated friction devices, said control including a source of fluid pressure, a plurality of solenoid valve means operable to direct pressurized fluid for controlling respective ones of said friction devices to establish respective speed ratios and a manual valve manipulable by a vehicle operator to select a desired drive range from a plurality of drive ranges with one of said drive ranges being operable to connect the source of fluid pressure with said solenoid valve means to permit automatic shifting between the speed ratios by selective energization of the solenoid valve means, wherein the improvement comprises: clutch priority control valve means for directing fluid flow to a low speed ratio friction device and a high speed ratio friction device, and being in fluid communication with said source of fluid pressure and another higher speed ratio friction device comprising; primary valve means for directing fluid flow to the low speed ratio friction device including a first fluid pressure responsive area means subjected to pressure from said source for urging said primary valve means in one direction, a second fluid pressure responsive area means subject to the fluid pressure in the low speed ratio friction device for urging said primary valve in the other direction, a third fluid pressure responsive area means subject to the fluid pressure in the higher speed ratio friction device for urging said primary valve means in the other direction, said first pressure responsive area means being greater than either of the second or third pressure responsive area means and less than the sum of the second and third pressure responsive area means and spring means for urging said primary valve in the one direction; secondary valve means for controlling fluid flow to the friction device controlling the high speed ratio including a first pressure responsive area means subjected to the source of pressure for urging the secondary valve means in the one direction, and second pressure responsive area means subject to the pressure in said friction device controlling the other high speed ratio for urging the secondary valve means in the other direction, the sum of said first area means of said secondary valve means and the first area means of said primary valve means being greater than the second pressure responsive area means of said secondary valve means and the sum of said second pressure responsive area means of said secondary valve means and either the second or third pressure responsive area means of said primary valve means being greater than the sum of the first pressure responsive area means of both the primary valve means and the secondary valve means whereby the simultaneous engagement of any two of the friction devices is prevented; and a torque converter clutch control portion operable to enforce disengagement of the torque converter clutch when the clutch priority valve is actuated by the simultaneous engagement of any two of the friction devices.

\* \* \* \* \*